United States Patent [19]

Erb

[11] Patent Number: 4,486,454
[45] Date of Patent: Dec. 4, 1984

[54] PRE-SLITTER BLADE IN A PEACH PITTER AND METHOD

[75] Inventor: John C. Erb, Carson City, Nev.

[73] Assignee: Filper Corporation, Reno, Nev.

[21] Appl. No.: 298,696

[22] Filed: Sep. 2, 1981

[51] Int. Cl.³ .......................... A23N 4/04; A23N 4/22
[52] U.S. Cl. ...................................... 426/485; 99/489; 99/551; 99/553; 99/554; 426/518
[58] Field of Search ................ 99/485, 486, 489–491, 99/544, 545, 547, 562, 551–554; 426/485, 484, 518

[56] References Cited

U.S. PATENT DOCUMENTS

| | | | |
|---|---|---|---|
| 2,675,039 | 4/1954 | Bauer | 99/552 |
| 2,826,227 | 3/1958 | Perrelli et al. | 146/28 |
| 3,370,625 | 2/1968 | Loveland | 99/552 |
| 4,054,675 | 10/1977 | Spence | 426/485 |
| 4,158,993 | 6/1979 | Spence | 99/486 |
| 4,183,294 | 1/1980 | Williams et al. | 99/552 |
| 4,206,697 | 6/1980 | Meissner | 99/489 |
| 4,254,701 | 3/1981 | Anderson et al. | 99/554 |

*Primary Examiner*—Timothy F. Simone

[57] ABSTRACT

Improvements to a torque-type peach pitter and method, during each cycle of which a peach is presented to a pair of peach bisecting and pit gripping blades for cutting the flesh of the peach to its pit at its suture plane and gripping the edges of the pit to hold it stationary and wherein the peach halves are twisted to separate them from the held pit. The improvements reside in a pre-slitter blade positioned to cut a portion of the peach flesh at the suture plane prior to its presentation to the peach bisecting and pit gripping blades.

The peach pitter includes a normally inoperative curved spoon which is extended upon the detection of a split or defective pit and serves to cut such pit from the peach. The pre-slitter blade detects the absence of a peach in any pitting cycle and triggers means to disable the spoon operating mechanism so that the spoon will not be extended during such cycle.

8 Claims, 8 Drawing Figures

FIG - 7 -

PRE-SLITTER BLADE IN A PEACH PITTER AND METHOD

BACKGROUND OF THE INVENTION

This invention relates to mechanical drupe pitters and methods, and more particularly to a pre-slitter blade for incising a kerf in the suture plane of a peach prior to its presentation to the peach gripping and bisecting blades of a torquetype peach pitter during each cycle of operation. The pre-slitter blade also functions to detect the absence of a peach during any cycle and to disable the "selective" spoon pitting function of such pitter.

Improvements in the art of mechanically pitting peaches and other drupes have resulted in efficient unitary mechanisms capable of selectively responding to diverse peach pitter situations. Thus, U.S. Pat. No. 4,254,701 describes a machine which includes a peach orienting assembly in the nature of a carousel to accept peaches through a gravity feed mechanism and orient them according to their blossom and stem ends and suture planes for presentation via a transfer mechanism to peach bisecting and pit gripping blades. In this type of machine a peach is bisected along its suture plane by the blades which, provided the pit is sound, simultaneously grip the pit, and allow the peach halves to be twisted or "torqued" in opposite directions by peach gripping jaws to separate the halves of peach flesh from the held pit. An initial cut is made by the blades as the peach is moved by the transfer mechanism into the pitting station between the blades and this cut is made deeper when the blades travel toward each other to the pit gripping position. When a split or defective pit is detected, as by overtravel of the blades through the pit gripping position, a mechanism such as that disclosed in U.S. Pat. No. 4,158,993, operates to "spoon" pit the unsound pit by means of a curved blade normally confined within the plane of one of the peach bisecting blades. The "spoon" serves upon extension to cut such an unsound pit from the peach.

One problem with cutting the peach with only the bisecting blades is that areas in the front and rear of the peach (the "stem" and "blossom" ends, respectively, according to the direction of transfer) remain uncut by the bisecting blades. It has been known to provide a third blade to cut the peach flesh at area near the blossom end, but the areas at the stem end and adjacent the pit have heretofore remained uncut prior to either torque or spoon pitting. This has resulted in a tearing of the peach flesh in the uncut areas, causing an unsightly appearance of the peach half, loss of juice (and attendant corrosion of the surrounding mechanism), and potential bruising of the peach by the peach gripping jaws because of the additional pressure which is needed to tear the peach in this area. A similar problem has been encountered in the vicinity of the pit-gripping portions of the bisecting blades. These portions must be anvils of a width sufficient to align and securely grip the pit by its edges. Therefore, the relative movement of these portions of the blades radially toward the pit has tended to crush, rather than slice, the uncut peach flesh through which they pass. This has caused similar problems with loss of juice, torn peach flesh, etc.

U.S. Pat. No. 4,206,697 discloses a mechanism for detecting the absence of a peach in a transfer mechanism, which mechanism is actuated in response to excessive movement in the arms of the transfer mechanism. Such a mechanism requires the addition of complicated linkage to the transfer mechanism and may interfere, in view of the delicate nature of peaches, with the sensitive tensioning of the transfer arms. Such prior art detection mechanism functions to disable the peach gripping jaws or cups which additionally complicates the machinery.

SUMMARY OF THE INVENTION

In the present invention a pre-slitter blade is positioned in the path of the transfer mechanism. As a peach is transferred from the alignment carousel to the gripping and bisecting blades, the pre-slitter blade cuts an arcuate kerf extending from the front or blossom end of the peach, over the top of the peach, and through the rear or stem end of the peach.

One of the objects of the invention is the provision of improved means and methods for cutting portions of the peach previously left uncut by the bisecting blades prior to twist pitting. The increased range of cutting eases the twisting operation and reduces damage to the fruit.

Another object of the invention is the provision of a single blade to cut both the blossom and stem portions of the peach previously left uncut by the peach bisecting blades.

Still another object of the invention is to provide a kerf in the top portion of the peach prior to its contact with the peach bisecting blades in order to reduce or eliminate the crushing heretofore caused by the radial movement of the pit gripping portions of the blades through uncut peach flesh.

Yet another object of this invention is the provision of a simple mechanism and method for disabling a spoon pitting mechanism during any cycle where no peach has been presented to the peach bisecting blades. In contrast to the complex mechanism of the prior art, this is conveniently accomplished by the simple expedient of utilizing the absence of movement of the pre-slitter blade to disable the spoon pitting mechanism.

Other objects and advantages will appear from the drawings and following description.

BRIEF DESCRIPTION OF THE DRAWINGS

The invention will be described with respect to the particular preferred embodiment shown in the drawings in which.

DESCRIPTION OF THE PREFERRED EMBODIMENT

Figure 1:
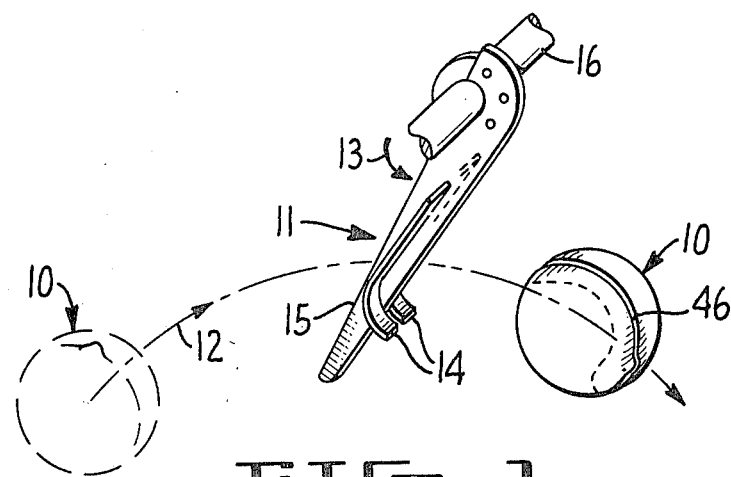
FIG. 1 is a perspective view of the pre-slitter blade of the present invention showing the kerf that has been made in a peach.

The device of this invention is intended for use with a typical torque-type peach pitter in which peaches are pre-oriented in a carousel or aligner 22 (FIGS. 2, 3, and 7) with their stem ends down and with their suture planes aligned with the central plane of the machine. Such pitters are commonly cyclical in operation and at the central plane of the machine a transfer mechanism, generally designated 24, transfers the peach, while maintaining such orientation, along a path of travel, designated by arrow 12, to a pitting station between a pair of peach bisecting blades 27, 28 in said central plane.

At such pitting station the blades move relatively toward each other slicing through the flesh of the peach until pit-gripping means, generally designated 55, on the advancing edges of said blades engage the edges of the pit and hold the same against rotational movement about an axis extending through said pit. Thereafter, in a typical torque pitting operation, opposing peach-gripping jaws or cups, generally designated 25 (FIGS. 2, 3) approach each other along said axis into gripping relation with the opposite peach halves and thereafter are rotated about said axis in opposite directions to twist the peach halves loose from the held pit.

The device of this invention may also be conveniently utilized with such a peach pitter having a "selective" feature, i.e., the ability to "spoon" pit or cut the pit loose from the flesh of the peach in the event the pit is split or otherwise unsound and unable to be gripped by the pit-gripping means 55. In one such selective pitter, upon the presence of a split or unsound pit being detected, a curved knife or spoon 39 (FIG. 2), normally residing in the plane of one of the blades 27, 28, is activated to cut around such pit. In the particular form depicted in FIGS. 5 and 7, for example, the spoon 39 is semi-circular and is extended by actuating means, generally designated 35, into the peach at approximately right angles to the plane of the peach bisecting blades so that upon rotation of peach-gripping jaws 25 a core including the unsound pit is cut from the peach.

The preferred embodiment of this invention includes a pre-slitter blade 11 (FIGS. 1, 7) depending in the central plane of the pitter from a rotatable shaft 16 extending transversely of said plane. Shoulders or flanges 14 project from opposite sides of said blade in spaced relation to its cutting edge 15 which faces aligner 22 so as to slit a peach 10 being transferred along path 12 when it contacts the preslitter blade 11. Flanges 14 are spaced from edge 15 and are curved downwardly and in the direction of transfer so as to remain in continuous contact with the surface of a peach 10 irrespective of the angle assumed between the pre-slitter blade 11 and the peach 10 so as to maintain a predetermined depth of cut as the peach proceeds through the transfer process (see FIG. 4). Flanges 14 also serve to prevent blade 11 from passing completely through a peach with a split pit. In FIG. 1, before (in phantom) and after views of peach 10 show the kerf 46 incised by blade 11.

The presence or spacing of flanges 14 from cutting edge 15 depends upon the context in which blade 11 is employed. In a pure torque pitting machine flanges 14 may be eliminated so that blade 11 incises kerf 46 through the peach flesh to the pit 45, thereby providing clean cut faces to the peach halves after pitting. Where the pitter includes a "selective" spoon pitting feature and blade 11 is employed to detect "no peach" (as will be later described), flanges 14 serve to insure positive movement of the blade and detection of a peach being presented to the bisecting blades.

Figure 3:
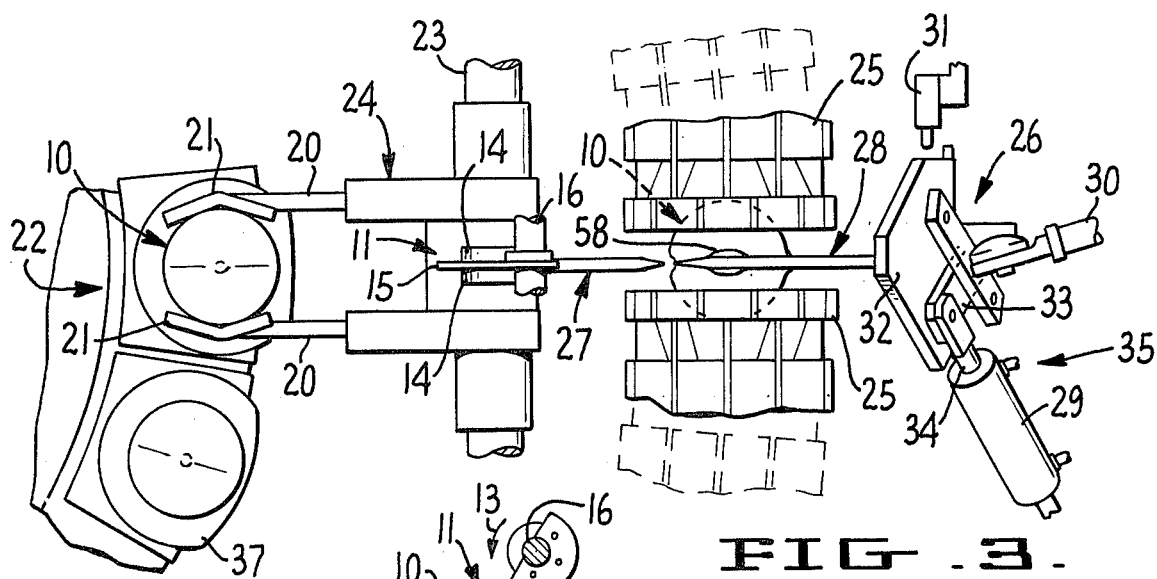
FIG. 3 is a top plan view of the apparatus of FIG. 2.
Figure 2:
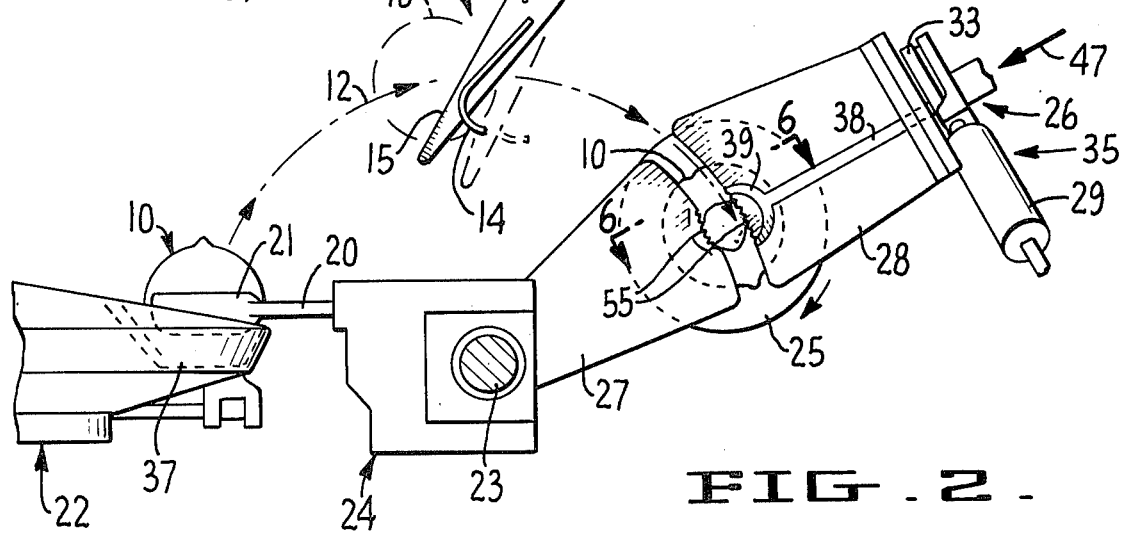
FIG. 2 is a fragmentary side elevational view of the peach pitting apparatus showing the path of travel imparted to a peach by the transfer mechanism and with the peach bisecting blades in a position gripping a sound pit for regular torque pitting.

FIGS. 2 and 3 illustrate the transferral of a peach 10 from an alignment cup 37 of the aligner 22 to the pitting station between lower and upper peach bisecting and pit gripping blades 27, 28. As a peach 10 is presented by the aligner 22 to the transfer mechanism 24 with its stem end down and its blossom end up, it is gripped on opposite sides by a pair of transfer pads 21 attached to a pair of transfer arms 20 which in turn pivot about the transverse axis of transfer shaft 23. Typically the aligner functions to orient the peach with its suture plane (the central plane of the peach through the widest dimension of the pit and including said blossom and stem ends) in the central plane of the machine between transfer arms 20.

In operation, rotation of the transfer arms 20 causes the peach 10 to describe the semi-circular path shown by arrow 12. Approximately half way through the path 12 the peach 10 contacts the cutting edge 15 of the pre-slitter blade 11 which causes the blade 11 to slit the flesh of the peach 10 to a pre-selected depth in its suture plane limited by contact of the spacing shoulders 14 with the surface of the peach 10. Pressing against the spacing shoulders 14, the peach 10 causes the blade 11 to swing about the axis of shaft 16 in the direction of arrow 13 (FIGS. 1, 2), whereby an arcuate kerf 46 is inscribed in the peach as shown in detail in FIG. 4, around approximately three-fourths of the periphery of the peach through both the blossom and stem ends.

Figure 5:
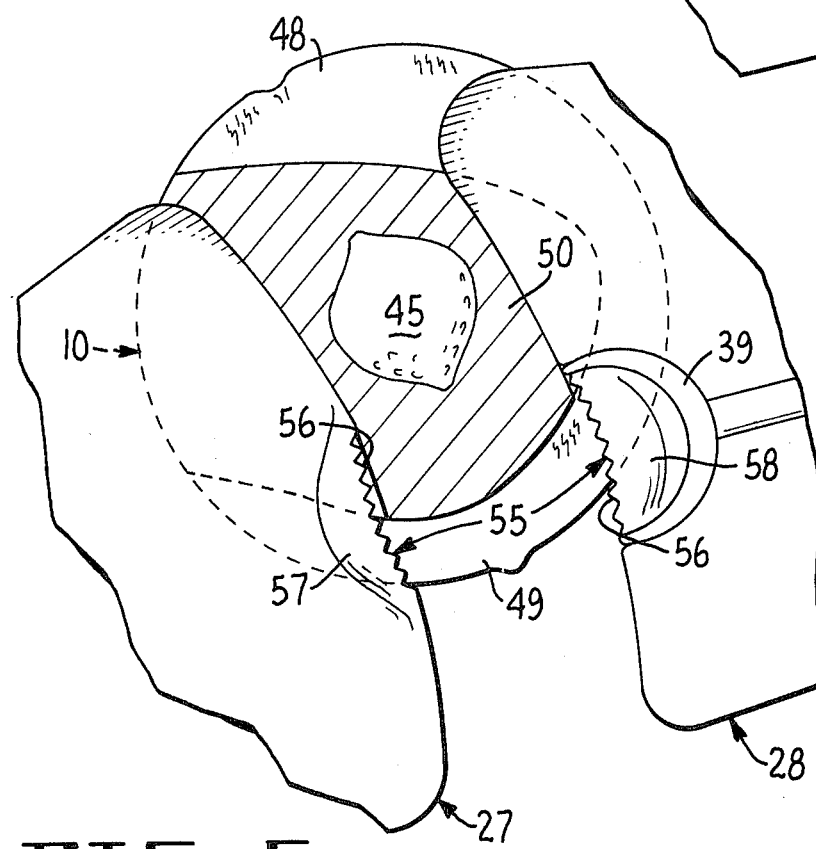
FIG. 5 is an enlarged elevational view of one half of a bisected peach and of the peach bisecting blades in open position for receiving the peach from the transfer mechanism after pre-slitting.

At the termination of the path shown by arrow 12 the peach is positioned by the transfer mechanism 24 at the pitting station between lower 27 and upper 28 peach bisecting blades (FIG. 2). At this point, the upper blade assembly, generally designated 26 and including actuating arm 30 (FIG. 1), lowers the upper blade 28 in the direction indicated by arrow 47, causing the pit 45 to be gripped between lower and upper pit gripping means generally designated 55 and comprising anvils 57, 58 (FIG. 5). Thereafter peach gripping jaws 25 (FIG. 3) converge from opposite sides of the blades, grip each half of peach 10 and rotate in opposite directions, causing torque pitting of the peach.

Figure 4:
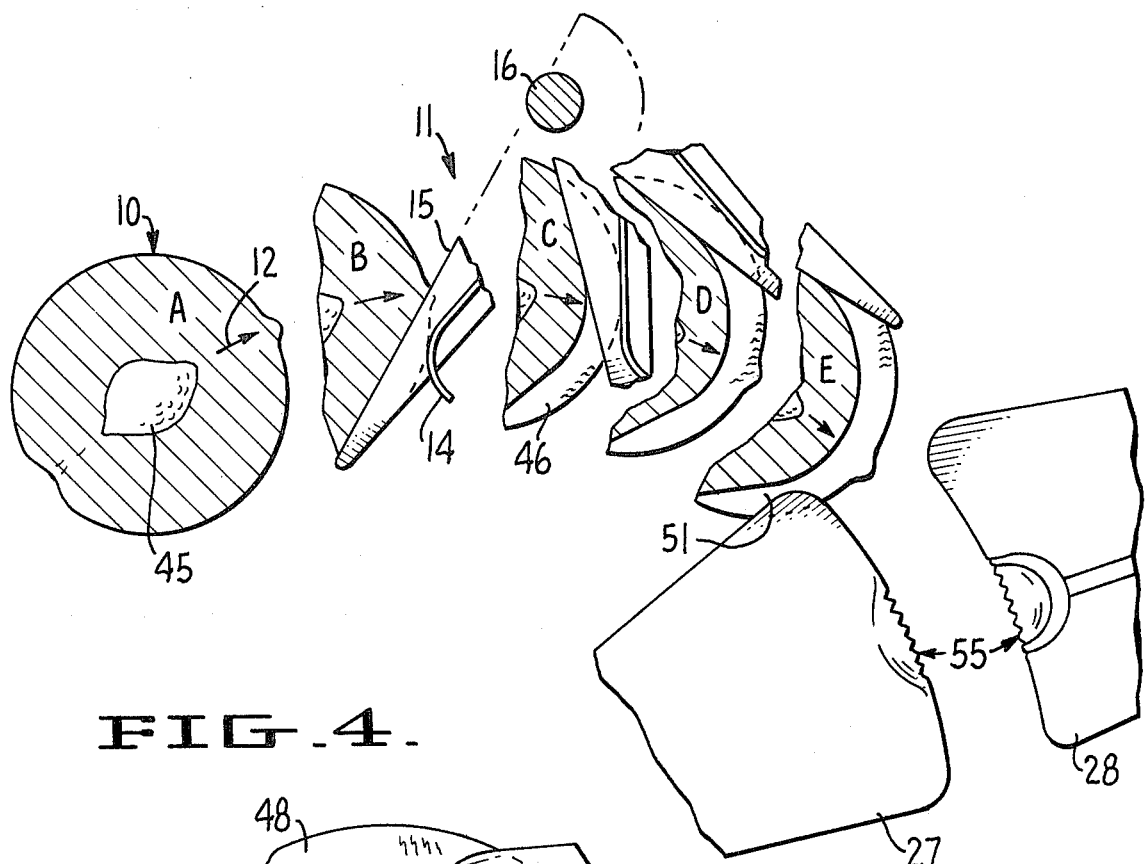
FIG. 4 is a composite view of the successive stages of the pre-slitting of a peach with the peach shown in section.

FIG. 4 illustrates, in a succession of views, A through E, the kerf 46 inscribed by the pre-slitter blade 11 as the blade 11 engages the peach and shaft 16 rotates during transfer of peach 10 to lower 27 and upper 28 peach bisecting blades. In position A can be seen an unslit peach 10. Position B shows the beginning of the pre-slitting process and illustrates the restraining action of shoulders 14. Finally, in position E can be seen the beginning entry of the sharpened cutting edges of lower blade 27 into the kerf 46 cut by blade 11.

FIG. 5 illustrates the full extent of the pre-slit kerf 46 as it appears after the peach has passed blade 11 and has entered further into the space between lower and upper blades 27, 28. Blade 11 is secured to shaft 16 which is journalled for swinging in bearings 17 (FIG. 7) supported on the main frame. At one end a torsion spring 18 biases blade 11 in a direction toward aligner 22. As the peach 10 has progressed to the position shown in FIG. 5 past blade 11, spring 18 returns said blade to its initial rest position (B, FIG. 4) where it is held by a valve actuating arm 71 (FIG. 7), secured to shaft 16, engaging a stop 69 supported on the frame, awaiting the arrival of the next peach in a succeeding cycle.

The spacing between the cutting edges of bisecting blades 27, 28 in open position to receive a peach is, of necessity, wider than the widest pit to be encountered (FIG. 5). As a consequence, bisecting blades 27, 28 only cut those portions of the peach flesh on opposite sides of and spaced somewhat from the pit 45. In FIG. 5 it can be seen that blade 11 cuts kerf 46 in a blossom end zone 49 and a stem end zone 48 which are in addition to and not coextensive with the cuts made by lower and upper blades 27, 28.

Figure 6:
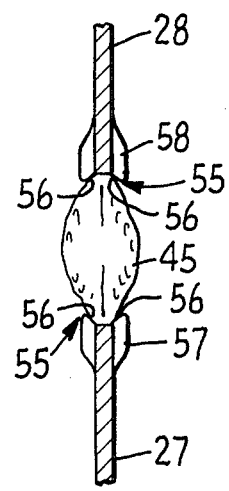
FIG. 6 is an enlarged sectional view of the upper and lower pit gripping anvils, gripping a pit, as seen from line 6—6 of FIG. 2, the flesh of the peach being omitted.

Furthermore, referring to FIG. 6, it can be seen that lower 27 and upper 28 blades contain pit gripping means 55 in the forms, respectively, of lower anvil 57 and upper anvil 58. Each anvil contains spaced rows of pit gripping teeth 56. In order that the pit 45 may be aligned and securely gripped by the rows of teeth 56, it is necessary that anvils 57, 58 be of a thickness considerably in excess of the thickness of the remainder of lower and upper blades 27, 28. The pre-slit kerf 46 not only aids entry of the initial cutting edges of blades 27 and 28 into the peach but also provides a pre-cut path for further movement of anvil 58 as it engages and pushes pit 45 into gripping relation with anvil 57 (FIG. 2) thereby limiting crushing and tearing peach flesh in zone 50 adjacent the pit (FIG. 5). Zones 48, 49 and 50, then, are areas wherein the peach flesh will not be torn upon opposing rotation of peach gripping jaws 25, or crushed by upper anvil 58 as occurred in prior art devices.

When the peach pitting apparatus is provided with a "selective" feature, as shown in FIGS. 2, 3, 5 and 7, one of the peach bisecting blades 27, 28 supports a curved spoon 39 on the end of shaft 38 journalled in the plane of blade 28. Spoon 39 normally resides in the plane of blade 28 adjacent pit gripping anvil 58 and the upper end of its shaft 38 is connected to a spoon actuating mechanism, generally designated 35, which includes a crank 33, supported on a bracket 32, and in turn connected to the piston rod 34 of a pneumatic cylinder 29 (FIGS. 2, 3, 7, 8).

Figure 7:
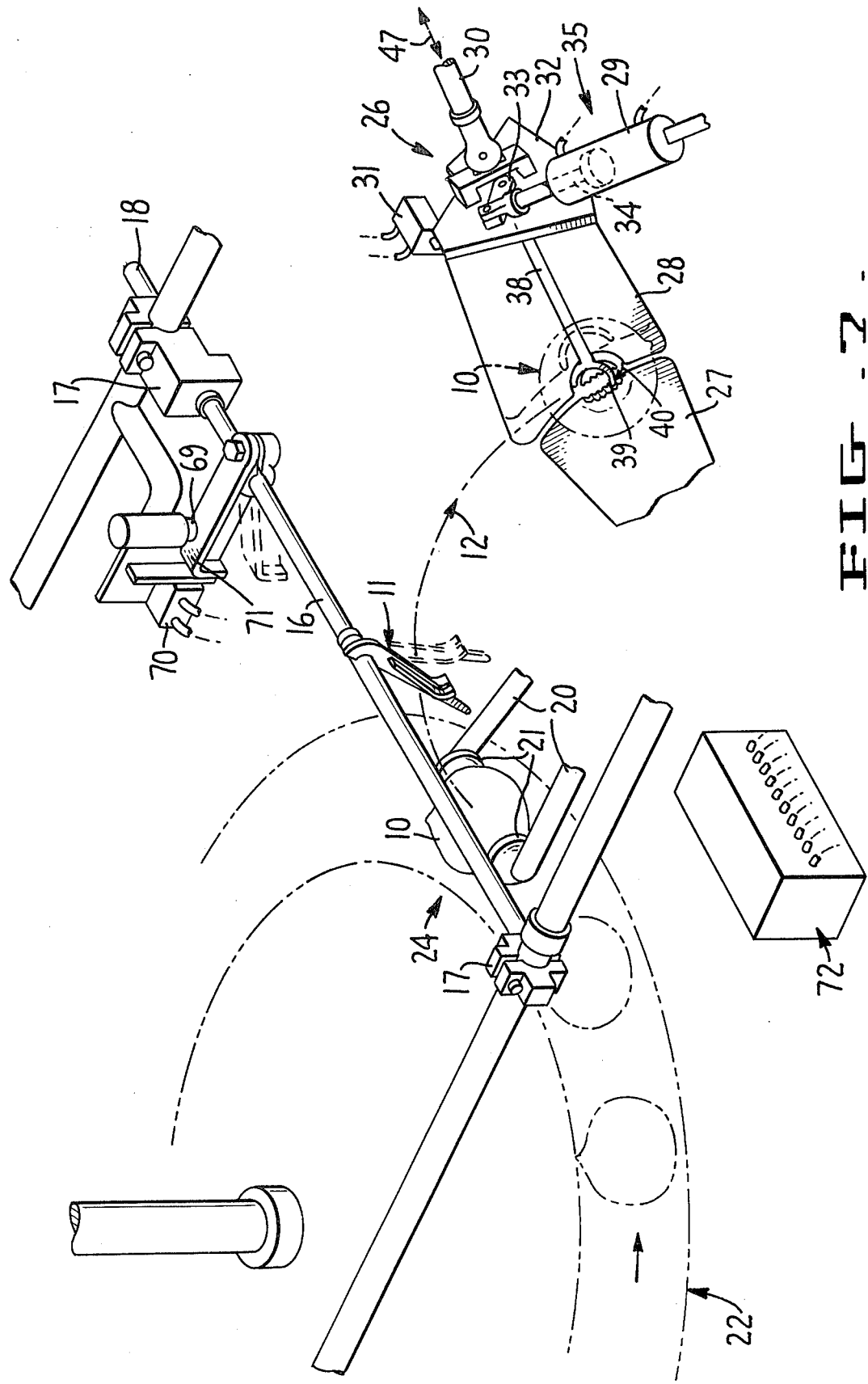
FIG. 7 is a fragmentary perspective view of the transfer and pitting mechanism shown in a position to spoon pit a peach having an unsound pit, including the spoon pitting actuation and disabling apparatus.
Figure 8:
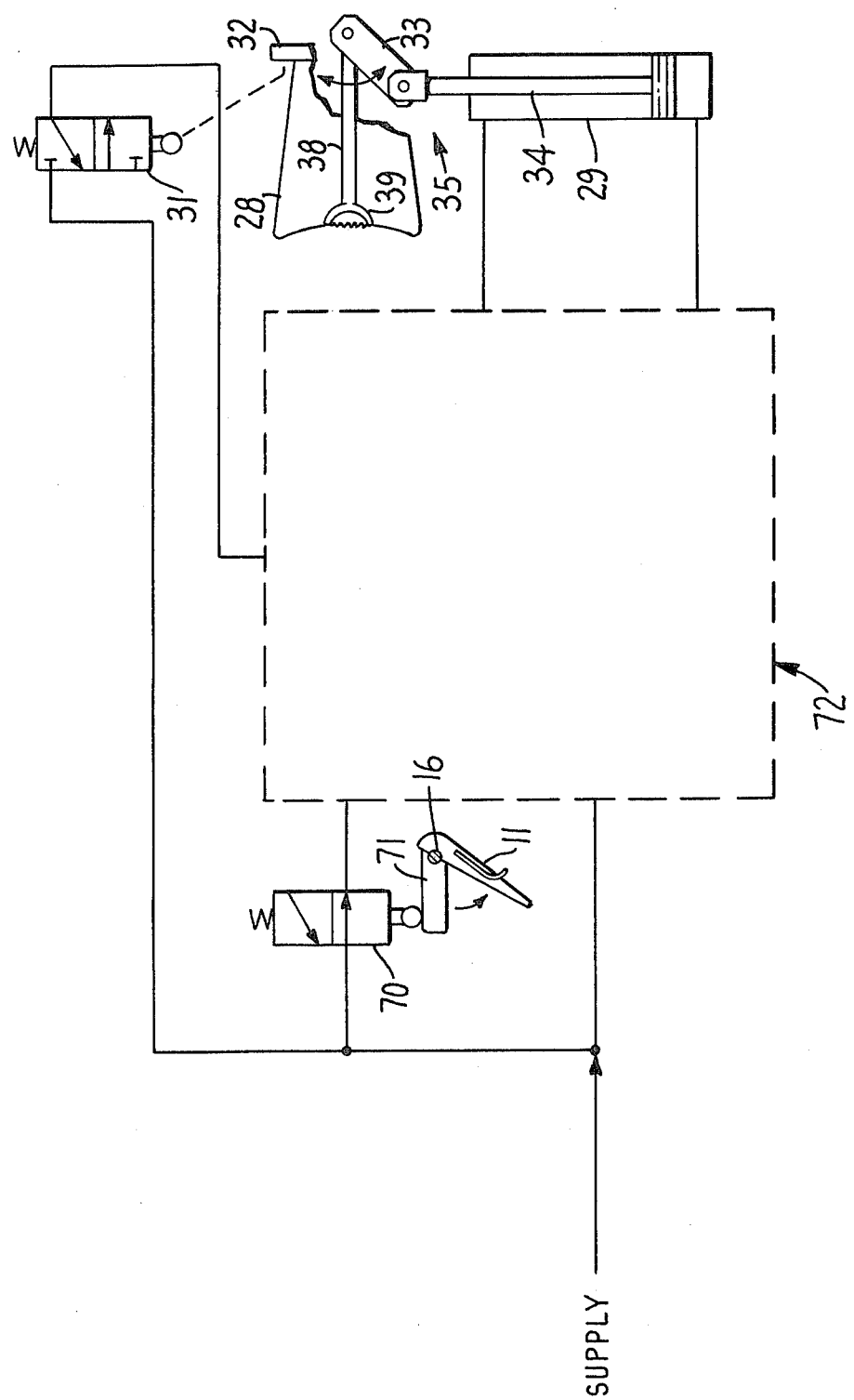
FIG. 8 is a schematic view of the spoon pitting actuation and disabling apparatus of FIG. 7, including the valve switching system.

As upper blade 28 moves toward lower blade 27 anvils 57, 58 engage and grip a sound pit 45 (FIG. 3) and hold it stationary for the normal torque pitting operation. In the event anvil 58 encounters a split or unsound pit, however, it will travel beyond such normal position through such pit to a position closer to blade 27 (FIG. 7). Such overtravel of blade 28 causes a portion or extension on blade mounting bracket 32 to engage the operator on an air valve 31 to change from its normally closed condition (FIG. 8) to an open position, thereby supplying an air signal to valve switching mechanism 72 (FIG. 8) to supply air cylinder 29 to rotate crank 33 and project spoon 39 out of the plane of blade 28 and into the flesh of the peach surrounding the unsound pit to cut the same from the peach (FIG. 7).

Valve switching means 72 (FIG. 8) is a conventional assembly of pneumatic valves with pilots for switching air from a "supply" to one or the other end of an operating cylinder, such as cylinder 29 for actuating spoon 39, depending on the signal received from a source, such as split pit detecting valve 31. Thus switching means 72 is responsive to the signal from valve 31 to actuation spoon pitting cylinder 29. Such valve switching means may also include appropriate valves and associated controls to inhibit the switching of the valves therein under desired conditions and to reset such valves after their function has been performed, as for example, to return cylinder 29 to the condition shown in FIG. 8 after spoon pitting has been accomplished.

It is obvious that other specific mechanisms may be employed to cut an unsound or split pit which cannot be gripped by means 55 and that the essence of the "selective" feature is the actuation of the spoon pitting means 35 responsive to detection of such pit by overtravel of the peach bisecting blades past their normal pit gripping relation with a sound pit.

It will be noted, however, that in the event a peach is not presented by mechanism 24 to blades 27 and 28 during any cycle, blade 28 will overtravel in the absence of a pit between anvils 57, 58 and, thereby, actuate spoon pitting means 35. In order to avoid undue wear on that mechanism and splattering of corroding peach flesh or juice which may have been adhered to spoon 39, this invention provides simple means for de-activating the spoon pitting mechanism in the event no peach is presented to the bisecting blades.

The detection of "no peach", i.e., the absence of a peach in the transfer arms 20 during rotation of those arms along arc 12, is conveniently accomplished by preslitter blade 11 which, not receiving pressure of a peach 10 against shoulders 14, will remain stationary. Hence, shaft 16 will not rotate and valve actuating arm 71 (FIGS. 7, 8) also attached to shaft 16 will not break contact with air valve 70. Valve 70 is normally open (FIG. 8) to provide an air signal to value switching means 72 which prevents or disables operation of spoon actuating mechanism 35, even though it may receive a signal from blade overtravel valve 31.

It will be obvious that means other than preslitter blade 11 may be employed to detect the absence of a peach being presented to peach bisecting blades 27, 28 and, responsive to such detection, disable the otherwise operable selective feature of spoon pitting. In the normal cycle where a peach 10 is transferred to the pit gripping means on the peach bisecting blades, such peach will contact preslitter blade 11, i.e., the presence of a peach will be detected, and if such peach has a split or unsound pit, the spoon pitting mechanism will be operative in the normal manner as indicated in FIG. 7.

In summary, it can be seen that pre-slitter blade of the present invention is surprisingly simple, but with a range of functions that provide a variety of useful improvements over the prior art, including cutting portions of the peach flesh not heretofore cut and providing means for detecting the absence of a peach at the pitting station to effect disabling of the spoon pitting mode.

While the above provides a full and complete disclosure of the preferred embodiment of this invention, various modifications, alternate constructions, and equivalents may be employed without departing from the spirit and scope of the invention as defined in the claims. For example, other types of feeders may be used to feed the peaches 10 to the pitting station or multiple pre-slitter blades might be used to slit both ends of the peach or to slit all the way through the flesh to the pit. As previously indicated "selective" spoon pitting means other than that specifically herein described may be utilized with "no peach" detection means other than the pre-slitter blade. Furthermore, electrical, hydraulic, mechanical or other systems may be employed or substituted for those disclosed to detect an unsound or split pit, to detect the absence of a peach during any cycle, or to actuate, disable, inhibit, or reset the spoon pitting and other related mechanisms.

What is claimed is:

1. In a method of pitting peaches in which the flesh of the peach is cut in a plane substantially to the pit from opposite sides preparatory to the opposed halves of the peach being twisted loose from the pit, the step comprising:

cutting a kerf in the flesh of the peach in said plane at opposite ends of the pit prior to making said cut from opposite sides of the pit.

2. The method of claim 1, in which:

said plane is the suture plane of the peach.

3. The method of claim 1, in which:

said kerf is cut through over 180° of the periphery of the peach including its stem and blossom ends.

4. In a method of cyclically torque pitting peaches with sound pits and automatically and selectively spoon pitting peaches with unsound pits at a single pitting station, in which the flesh of a peach present at said station is cut in a plane substantially to the pit from opposite sides preparatory to either torque pitting or spoon pitting, the steps comprising:

cutting a kerf in the flesh of the peach in said plane at opposite ends of the pit prior to making said cuts from opposite sides of the pit;

detecting the absence of a peach at said station during any cycle by the non-performance of said kerf-cutting step; and, disabling the spoon pitting function responsive to detecting the absence of a peach.

5. In a torque-type peach pitter in which a peach is presented to peach bisecting blades having opposed pit gripping means thereon and lying in a plane at a pitting station, the improvement comprising:

pre-slitting means supported in said plane remote from said station for incising a kerf in a peach prior to its presentation to the bisecting blades.

6. The improvement of claim 5, in which:

said pre-slitting means is mounted to engage at least the opposite ends of said peach for incising such kerf in both said opposite ends.

7. The improvement of claim 5, including:

detecting means associated with said pre-slitt(er)ing means for detecting the absence of a peach being presented to said bisecting blades.

8. In the peach pitter of claim 5, which also includes means for performing other pitting functions, the improvement comprising:

detecting means connected to said pre-slitting means for detecting the absence of a peach being presented to said bisecting blades; and, disabling means responsive to said detecting means for modifying (some) at least one of said means for performing other pitting functions.

* * * * *